(12) United States Patent
Rahm et al.

(10) Patent No.: US 12,525,842 B2
(45) Date of Patent: Jan. 13, 2026

(54) VEHICLE ENERGY DISSIPATION SYSTEM USING AIR COMPRESSOR AND ELECTRIC MOTOR ARRANGEMENT

(71) Applicant: Volvo Truck Corporation, Gothenburg (SE)

(72) Inventors: Fredrik Rahm, Hörby (SE); Peter Tennevall, Malmö (SE); Fredrik Larsson, Vellinge (SE)

(73) Assignee: Volvo Truck Corporation, Gothenburg (SE)

( * ) Notice: Subject to any disclaimer, the term of this patent is extended or adjusted under 35 U.S.C. 154(b) by 233 days.

(21) Appl. No.: 18/334,540

(22) Filed: Jun. 14, 2023

(65) Prior Publication Data

US 2024/0001807 A1 Jan. 4, 2024

(30) Foreign Application Priority Data

Jul. 4, 2022 (EP) ..................................... 22182752

(51) Int. Cl.
*H02K 5/20* (2006.01)
*B60L 7/22* (2006.01)
(Continued)

(52) U.S. Cl.
CPC ......... *H02K 5/207* (2021.01); *F04D 29/5813* (2013.01); *H01C 1/082* (2013.01);
(Continued)

(58) Field of Classification Search
CPC ............ H02K 5/18; H02K 5/20; H02K 5/207; H02K 5/1672; F04D 29/5806;
(Continued)

(56) References Cited

U.S. PATENT DOCUMENTS

| 5,904,471 | A | * | 5/1999 | Woollenweber | .... F04D 27/0215 |
| | | | | | 417/423.9 |
| 6,129,524 | A | * | 10/2000 | Woollenweber | ...... F04D 25/082 |
| | | | | | 417/366 |

(Continued)

FOREIGN PATENT DOCUMENTS

| DE | 102021206598 | A1 | * | 12/2022 | | |
| EP | 194837 | A | * | 9/1986 | ............. | F04D 25/02 |
| EP | 3141757 | A1 | | 3/2017 | | |
| EP | 3242002 | A1 | | 11/2017 | | |

OTHER PUBLICATIONS

English Machine Translation of DE-102021206598-A1 (Year: 2021).*
Extended European Search Report for European Patent Application No. 22182752.0, mailed Jan. 9, 2023, 10 pages.

*Primary Examiner* — Nathan C Zollinger
(74) *Attorney, Agent, or Firm* — Withrow & Terranova, PLLC

(57) ABSTRACT

An energy dissipation system for a vehicle, the energy dissipation system comprising an air compressor comprising a compressor inlet configured to receive ambient air, an electric motor comprising a rotor having a rotor shaft operatively connected to a compressor shaft of the air compressor, power electronics arranged in a power electronics housing, the power electronics being electrically connected to the electric motor and configured to feed electric power to the electric motor, and an air flow channel through which the ambient air is configured to be fed to the compressor inlet, the air flow channel being formed by an inner elongated tube member and an outer elongated tube member, wherein the electric motor is housed within the inner elongated tube member and attached to a first inner surface, and wherein the power electronics housing is attached to a second outer surface.

12 Claims, 5 Drawing Sheets

(51) Int. Cl.
  *F04D 25/06*    (2006.01)
  *F04D 29/58*    (2006.01)
  *H01C 1/082*    (2006.01)
  *H02K 5/167*    (2006.01)
  *H02K 5/18*     (2006.01)

(52) U.S. Cl.
  CPC ............ *B60L 7/22* (2013.01); *F04D 25/0606* (2013.01); *H02K 5/1672* (2013.01); *H02K 5/18* (2013.01); *H02K 5/20* (2013.01)

(58) Field of Classification Search
  CPC ............ F04D 29/5813; F04D 25/0606; F04D 25/082; H01C 1/082; B60L 7/22
  See application file for complete search history.

(56) References Cited

U.S. PATENT DOCUMENTS

| | | | |
|---|---|---|---|
| 6,398,517 B1 * | 6/2002 | Choi | F04D 29/057 417/423.12 |
| 6,508,324 B1 | 1/2003 | Conley, Jr. | |
| 6,924,050 B2 * | 8/2005 | Lahiff | B60L 58/33 429/444 |
| 10,218,245 B2 * | 2/2019 | Oxman | F04D 17/122 |
| 11,813,964 B2 * | 11/2023 | Audhav | F16D 61/00 |
| 12,347,590 B2 * | 7/2025 | Rahm | H01C 1/082 |
| 2003/0200761 A1 | 10/2003 | Funahashi et al. | |
| 2012/0121447 A1 | 5/2012 | Hayashi et al. | |
| 2024/0217516 A1 * | 7/2024 | Sommansson | B60L 15/2009 |

* cited by examiner

VEHICLE ENERGY DISSIPATION SYSTEM USING AIR COMPRESSOR AND ELECTRIC MOTOR ARRANGEMENT

RELATED APPLICATIONS

The present application claims priority to European Patent Application No. 22182752.0, filed on Jul. 4, 2022, and entitled "ENERGY DISSIPATION SYSTEM," which is incorporated herein by reference in its entirety.

TECHNICAL FIELD

The present invention relates to an energy dissipation system for a vehicle. The energy dissipation system is advantageously incorporated into a vehicle and configured to dissipate electric power generated by an electric traction motor. The present invention also relates to a braking system and a vehicle comprising such an energy dissipation system. Although the invention will mainly be directed to a vehicle in the form of a truck using an electric traction motor propelling the vehicle, the invention may also be applicable for other types of vehicles at least partially propelled by an electric traction motor, such as e.g., an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g., a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a means for improving the dissipation of electric energy when e.g., the vehicle battery is fully charged, i.e., when the so-called state-of-charge level is above a predetermined threshold limit. It is also a desire to improve the cooling capacity of components forming part of the energy dissipation process, since these components may potentially be exposed to relatively high temperature levels.

SUMMARY

It is thus an object of the present invention to at least partially overcome the above described deficiencies.

According to a first aspect, there is provided an energy dissipation system for a vehicle, the energy dissipation system comprising an air compressor comprising a compressor inlet configured to receive ambient air, and a compressor outlet configured to exhaust pressurized air, an electric motor comprising a rotor having a rotor shaft operatively connected to a compressor shaft of the air compressor, power electronics arranged in a power electronics housing, the power electronics being electrically connected to the electric motor and configured to feed electric power to the electric motor, and an air flow channel through which the ambient air is configured to be fed to the compressor inlet, the air flow channel being formed by an inner elongated tube member and an outer elongated tube member, wherein the outer elongated tube member is radially spaced apart from the inner elongated tube member, the inner elongated tube member comprising a first inner surface and a first outer surface, and the outer elongated tube member comprises a second inner surface and a second outer surface, the first outer surface and the second inner surface facing each other, wherein the electric motor is housed within the inner elongated tube member and attached to the first inner surface, and wherein the power electronics housing is attached to the second outer surface.

The power electronics should be construed as electronics components arranged for operating the electric motor. The power electronics may thus comprise inverters configured to convert the direct current to alternating current which can be used by the electric machine. The power electronics is preferably receiving electric power from e.g., a junction box of the vehicle, which in turn receives electric power from e.g., an energy storage system and/or from an electric traction motor when the electric traction motor is generating electric power during braking. The electric motor is thus operated by electric power from the power electronics. Hence, the electric energy can be dissipated by controlling the electric motor to operate the air compressor.

Moreover, it should be readily understood that the inner and outer elongated tubes need not necessarily be arranged in such a way that air is flowing in all radial directions of the air flow channel. For example, air may flow in the air flow channel at specific portions radially from the electric motor. In such a case, the air flow channel is not fully surrounding the electric motor. However, and obviously, the air flow channel may also fully surround the electric motor. Likewise, the power electronics housing must not fully encapsulate the outer elongated tube member. Rather, the power electronics housing may be attached to a portion of the second outer surface.

The present invention is based on the insight that by attaching the electric motor and the power electronics to a respective side of the air flow channel directing air to the air compressor, this intake air to the air compressor can be used for cooling both the electric motor as well as the power electronics feeding electric power to the electric motor. A compact and dense solution with increased cooling capacity is provided and the need of using the conventional engine coolant for cooling the electric motor and power electronics is no longer needed for that purpose. Hence, separate air fans or the like can be omitted by the present invention. Also, since the electric motor and power electronics are cooled off via their attachment on surfaces outside the air flow channel, there is a reduced risk of debris and particles flowing into these components. In other words, the coolant air will not be directly in contact with the electric motor and the power electronics. Rather, the electric motor and power electronics will be conductively cooled by the thermal transmission via the surfaces of the inner and outer elongated tube members. The inner and outer elongated tube members are thus preferably made from a thermally conductive material. According to a non-limiting example, the inner and outer elongated tube members are made by aluminium, or other material having a high heat transfer coefficient.

According to an example embodiment, the power electronics housing may be attached to the second outer surface at a position radially outside the electric motor. Hereby, the power electronics housing is positioned directly radially from the electric motor, which may simplify the wiring connection between the power electronics and the electric motor.

According to an example embodiment, the electric motor may comprise a stator housing the rotor, the stator being attached to the first inner surface. The rotor is thus arranged inside the stator.

According to an example embodiment, the inner elongated tube member may be arranged in a circular cross section. As the electric motor preferably comprises a stator of circular cross section, such stator may be attached to the first inner surface around the entire circumference, whereby cooling of the electric motor can be improved. Preferably, the outer elongated tube member is also arranged in a circular cross section. Hereby, the flow velocity obtained through the air flow channel may be relatively high, which is beneficial from a cooling perspective.

According to an example embodiment, the second outer surface may comprise a flat surface portion, the power electronics housing being attached to the flat surface portion.

According to an example embodiment, the energy dissipation system may further comprise a cooling structure arranged in the air flow channel. The cooling structure may advantageously increase the coolant of the inner and outer elongated tube members, whereby an increased cooling effect of the electric motor and the power electronics can be obtained. Preferably, and according to an example embodiment, the cooling structure may extend along the air flow channel and may be attached to at least one of the first outer surface and the second inner surface.

According to an example embodiment, the cooling structure may comprise a first plurality of cooling protrusions, the first plurality of cooling protrusions is arranged at the first outer surface and extends towards the second inner surface. The first plurality of cooling protrusions are hereby attached to the first outer surface, either as integrally formed or connected to the first outer surface by attachment elements. The first plurality of cooling protrusions may thus form part of the first outer surface. The first plurality of cooling protrusions extends towards, but is not in physical contact with, the second inner surface. The first plurality of cooling protrusions hereby increases the coolant towards the electric motor.

According to an example embodiment, the cooling structure may comprise a second plurality of cooling protrusions, the second plurality of cooling protrusions is arranged at the second inner surface and extends towards the first outer surface. In a similar vein as the first plurality of cooling protrusions, the second plurality of cooling protrusions are attached to the second inner surface, either as integrally formed or connected to the second inner surface by attachment elements. The second plurality of cooling protrusions may thus form part of the second inner surface. The second plurality of cooling protrusions extends towards, but is not in physical contact with, the first outer surface. The second plurality of cooling protrusions hereby increases the coolant towards the power electronics.

According to an example embodiment, a number of cooling protrusions of the first plurality of cooling protrusions and a number of cooling protrusions of the second plurality of cooling protrusions may be different. According to an example embodiment, the number of cooling protrusions of the second plurality of cooling protrusions may be higher than the number of cooling protrusions of the first plurality of cooling protrusions. As an alternative, the number of cooling protrusions of the first plurality of cooling protrusions may be higher than the number of cooling protrusions of the second plurality of cooling protrusions.

According to an example embodiment, the cooling structure may comprise a third plurality of cooling protrusions, each cooling protrusion of the third plurality of cooling protrusions extends between the first outer surface and the second inner surface. The third plurality of cooling protrusions are attached to the first outer surface and to the second inner surface, either as integrally formed or connected to the respective surfaces by attachment elements. The third plurality of cooling protrusions may thus form part of the first outer surface and the second inner surface. The third plurality of cooling protrusions hereby increases the coolant towards both the electric motor and the power electronics.

According to an example embodiment, the energy dissipation system may further comprise a gearbox arranged between the electric motor and the air compressor. The gearbox may comprise coolant channels directed into the air flow channel, such that the air flowing through the air flow channel also serves as coolant for the gearbox.

According to an example embodiment, the energy dissipation system may further comprise an air cooled resistor, the air cooled resistor being arranged in downstream fluid communication with the air compressor for receiving a flow of pressurized air. The air cooled resistor may thus be advantageously used for dissipating a further amount of electric energy, as well as to increase the temperature of the pressurized air flowing out from the air compressor. Such heated air may subsequently be used for heating various components or structures in the vehicle in need of an increased temperature.

According to an example embodiment, the rotor shaft may be suspended to a stationary motor housing by a pair of air bearings. The air bearings may, according to an example, be fluidly connectable to an air tank of the vehicle for receiving pressurized air from such air tank. The air bearings may, as an alternative, be arranged as so-called dynamic air bearings not receiving air from an air tank for their operational functionality.

According to a second aspect, there is provided a braking system for a vehicle, the braking system comprising an electric traction motor configured to generate electric power during braking, an electric power system comprising an energy storage system configured to receive electric power from the electric traction motor during braking, and an energy dissipation system according to any one of the embodiments described above in relation to the first aspect, wherein the power electronics is electrically connected to the electric power system and configured to receive electric power generated during braking when an energy absorption capability of the energy storage system is below a predetermined threshold limit.

According to an example embodiment, the air cooled resistor comprises an electrically conductive resistor element electrically connected to the electric power system. Hereby, the air cooled resistor is arranged to dissipate electrical energy in series downstream the air compressor, and thus cooled by the pressurised air from the air compressor. The pressurized air flowing through the air cooled resistor will be heated by the electric energy flowing through the electrically conductive resistor element, and the heated air can subsequently, i.e., downstream the air cooled resistor, be used for heating various vehicle components.

Further effects and features of the second aspect are largely analogous to those described above in relation to the first aspect.

According to a third aspect, there is provided a vehicle, comprising an electric traction motor configured to propel the vehicle, an electric power system comprising an energy storage system, wherein the electric power system is electrically connected to the electric traction motor, and an energy dissipation system according to any one of the embodiments described above in relation to the first aspect, wherein the power electronics is electrically connected to the electric power system for dissipating electric power generated by the electric traction motor during braking.

Effects and features of the third aspect are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
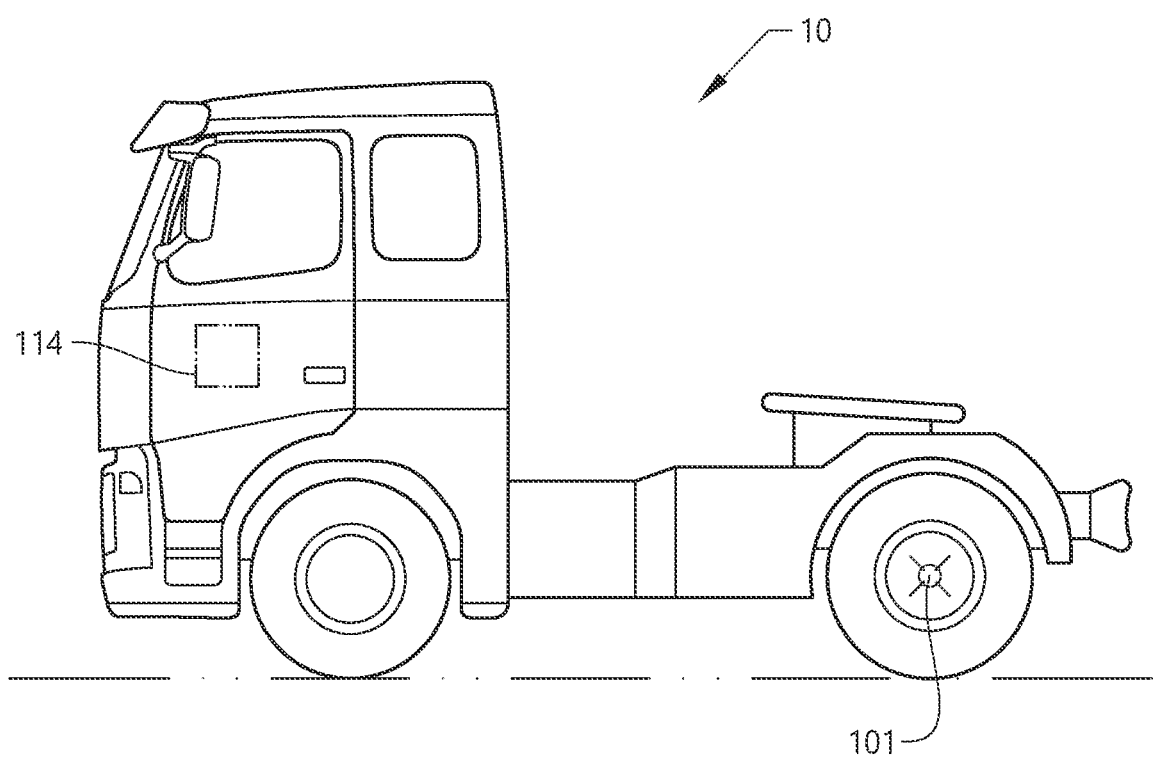
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. In FIG. 1, the truck is depicted as being front wheel driven but is should be readily understood that the invention is equally applicable for a rear wheel driven truck, or a four wheel driven truck, etc. The traction motor 101 is in the example embodiment an electric traction motor 101 in the form of an electric machine, which is arranged to receive electric power from a source of electric power (104 in FIG. 2), which may be e.g., an electric power system and/or a fuel cell system. The source of electric power may also in the following be referred to as an electric power system 104. The vehicle 10 also comprises a control unit 114 for controlling various operations as will also be described in further detail below, and a braking system (not shown in detail in FIG. 1) operable to perform an auxiliary braking action for the vehicle 10.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
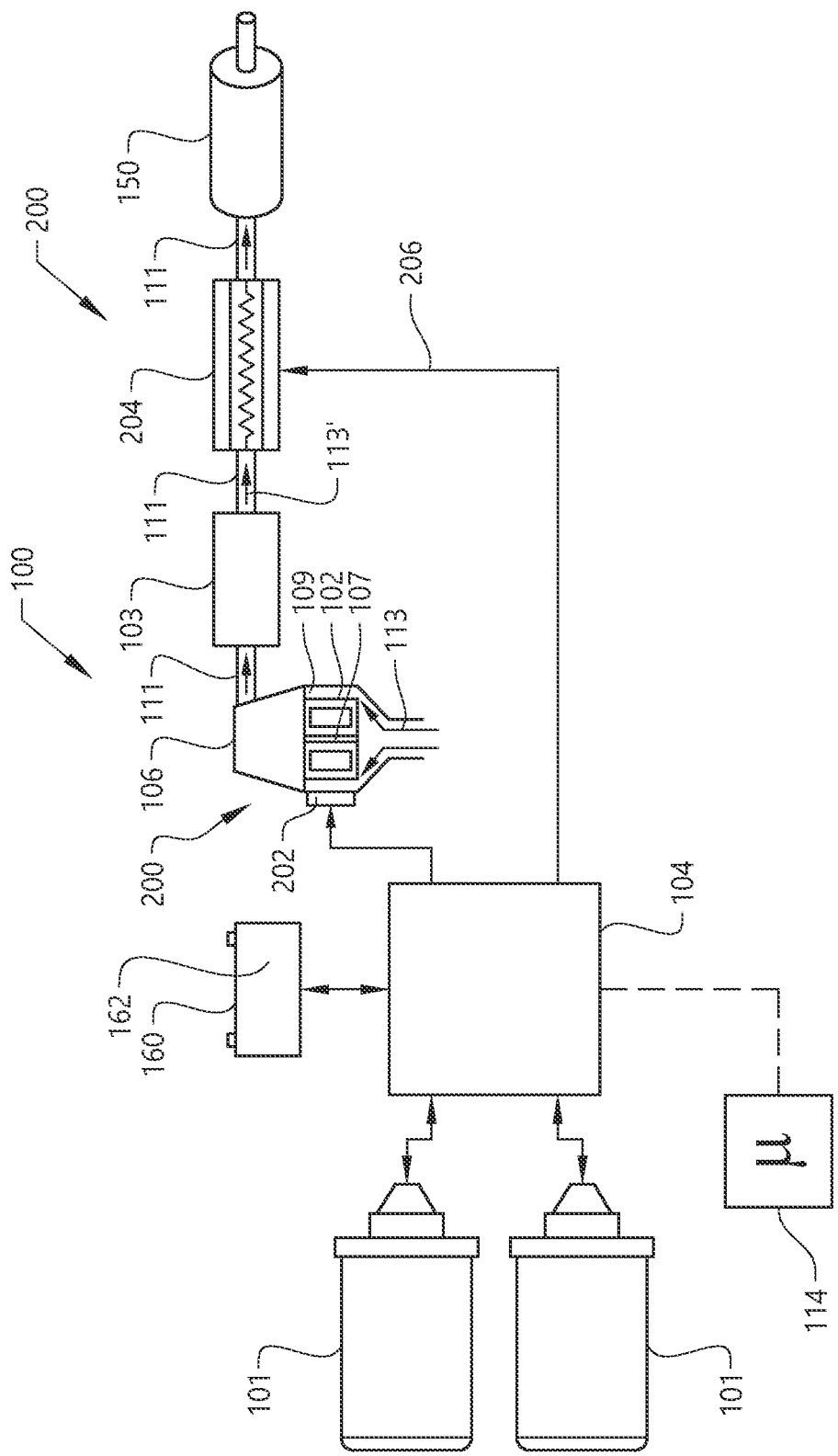
FIG. 2 is a schematic illustration of a braking system according to an example embodiment.

In order to describe the braking system 100 in further detail, reference is made to FIG. 2 which is a schematic illustration of a braking system according to an example embodiment. As can be seen in FIG. 2, the braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric traction motor(s) 101 when the electric traction motor(s) 101 is/are propelling vehicle and to receive electric power from the electric traction motor(s) 101 when the electric traction motor(s) 101 generates electric power during braking. Thus, the braking system 100 can be referred to as an auxiliary braking system 100.

The source of electric power 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 generates electric power during braking, i.e., operates in a regenerative braking mode. The battery 162 is also arranged to supply electric power to the electric traction motor(s) 101 when the electric traction motor(s) 101 propel the vehicle 10. Although not depicted in FIG. 2, the source of electric power 104 may comprise various components, such as traction inverters, brake inverters, a junction box, etc.

The above described control unit 114 is connected to the source of electric power 104. The control unit 114 comprises control circuitry for controlling operation of the electric power system. The control unit 114 thus receives data from the source of electric power 104, such as e.g., a state-of-charge (SOC) of the battery 162, etc., and transmits control signals to the source of electric power 104. As will be evident from the below disclosure, the control signals from the control unit 114 to the source of electric power 104 may, for example, comprise instructions to which device the source of electric power 104 should supply electric power during regenerative braking.

In order to describe the braking system 100 in further detail, reference is made to FIG. 2 which is a schematic illustration of a braking system according to an example embodiment. As can be seen in FIG. 2, the braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric traction motor(s) 101 when the electric traction motor(s) 101 is/are propelling vehicle 10, and to receive electric power from the electric traction motor(s) 101 during braking. Thus, the braking system 100 can be referred to as an auxiliary braking system 100.

The electric power system 104 further comprises an energy storage system 160. The energy storage system 160 is preferably arranged in the form of a vehicle high voltage battery and will in the following merely be referred to as a battery 162. The battery 162 is configured to receive electric power generated by the electric traction motor(s) 101 when the electric traction motor(s) 101 operates in the regenerative braking mode. The battery 162 is also arranged to feed electric power to the electric traction motor(s) 101 when the electric traction motor(s) 101 propel the vehicle 10. Although not depicted in FIG. 2, the electric power system 104 may comprise various components, such as traction inverters, brake inverters, a junction box, etc.

The above described control unit 114 is connected to the electric power system 104. The control unit 114 comprises control circuitry for controlling operation of the electric power system. The control unit 114 thus receives data from the electric power system 104, such as e.g., a state-of-(SOC) of the battery 162, etc, and transmits control signals to the electric power system 104.

The braking system 100 further comprises an energy dissipation system 200. The energy dissipation system 200 comprises an electric motor 102 and an air compressor 106 and will be described in further detail below. The electric motor 102 is connected to the electric power system 104 via power electronics 202, preferably in the form of one or more inverters. The electric motor 102 is thus operated by receiving electric power from the electric power system 104. The electric motor 102 is hence arranged as an electric power consumer. The air compressor 106 comprises a compressor inlet 109 configured to receive a flow of ambient air 113. The air compressor 106 is configured to pressurize the air and exhaust the pressurized air 113' to an air conduit 111. The pressurized air is hence further fed through the air conduit 111 downstream the air compressor 106. The air compressor 106 is connected to, and operable by, the electric motor 102. As illustrated in FIG. 2, the air compressor 106 is mechanically connected to the electric motor 102 by rotor shaft 107 of the electric motor 102. In further detail, the air compressor 106 is operated by rotation of the rotor shaft 107, which rotation is generated by operating the electric motor 102.

Moreover, the energy dissipation system 200 also comprises an air cooled resistor, the air cooled resistor 204. The air cooled resistor 204 is arranged in the air conduit 111 in downstream fluid communication with the air compressor 106 for receiving a flow of pressurized air. The air cooled resistor 204 is also electrically connected to, and operable by, the electric power system 104. Thus, also the air cooled resistor 204 is arranged as an electric power consumer. When the air cooled resistor 204 receives electric power from the electric power system 104, the pressurized air from the air compressor is heated by electrically conductive resistor elements of the air cooled resistor 204. The pressurized and heated air is thereafter directed towards the ambient environment or other components in need of thermal management. The air from the air cooled resistor 204 is preferably directed into a muffler 150 of the braking system 100. The muffler 150 reduces noise and can also provide a pressure drop of the air.

According to the exemplified embodiment in FIG. 2, the braking system 100 optionally comprises a flow restriction arrangement 103 in the air conduit 111. The flow restriction arrangement 103 is arranged in downstream fluid communication with the air compressor 106 and configured to increase the pressure level of the flow of air exhausted by the air compressor 106.

Although not depicted in FIG. 2, it should be readily understood that the control unit 114 can be connected to other components in addition to the connection to the electric power system 104. For example, the control unit 114 may be connected to the electric traction motor(s) 101, the battery 162, the electric machine 102, the air heating arrangement 108, as well as connected to an upper layer vehicle control system (not shown).

During operation of the braking system 100, i.e., when the electric traction motor 101 operates as generators to control the vehicle speed, i.e., the vehicle 10 operates in the regenerative braking mode, electric power is fed from the electric traction motor 101 to the electric power system 104. If the battery 162 is not able to receive all, or parts of the electric power generated by the electric traction motor 101, for example because of the current electric charging capacity, i.e. the level of electric power the battery is able to receive until being fully charged or has reached its maximum allowed state of charge level, the excess electric power should preferably be dissipated. In the present case, the electric power system 104 is controlled to supply electric power to the electric motor 102. The electric motor 102 is hereby, by the received electric power from the electric power system 104, rotating the rotor shaft 107 to operate the air compressor 107. The air compressor 107 in turn pressurize air and feeds the pressurized air further through the air conduit 111.

Figure 3:
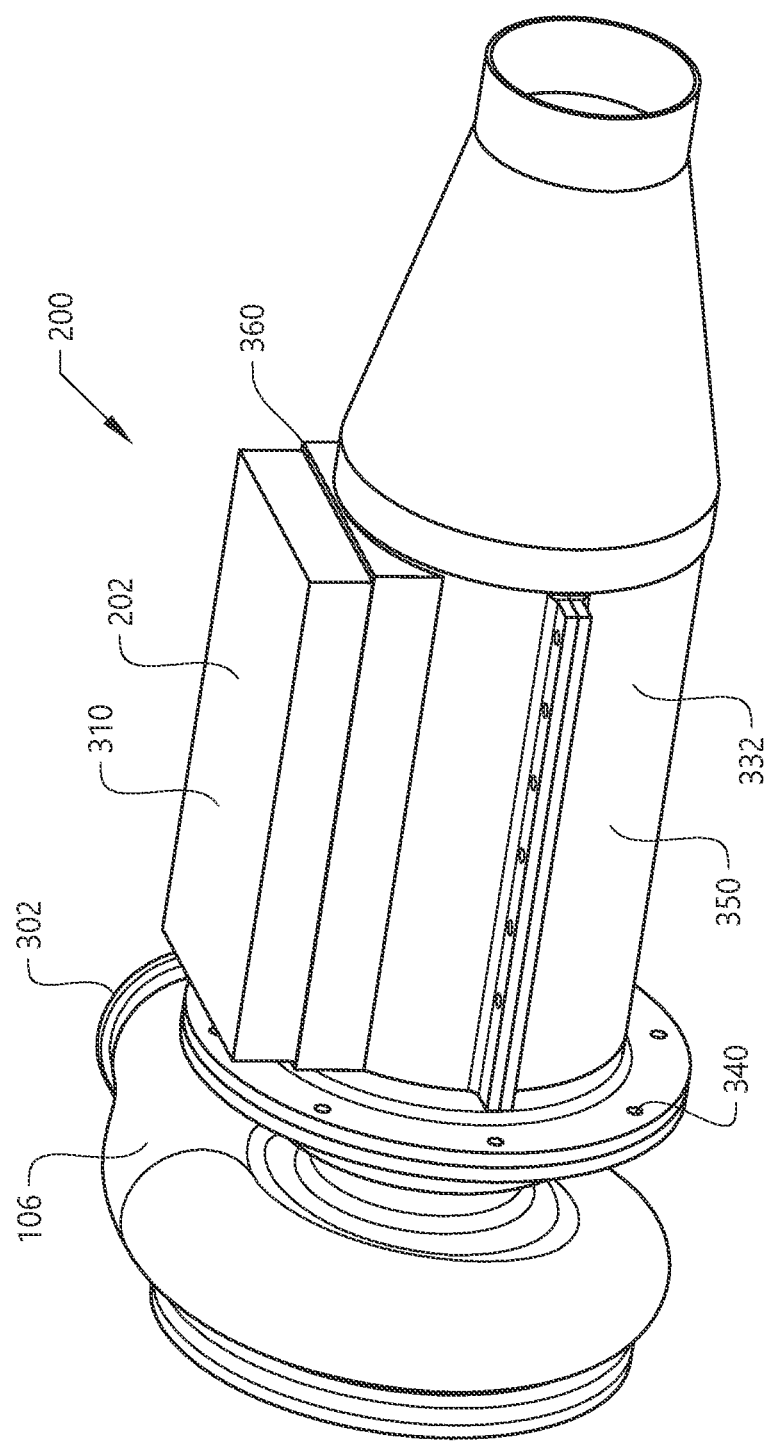
FIG. 3 is a perspective view of an energy dissipation system according to an example embodiment.
Figure 4:
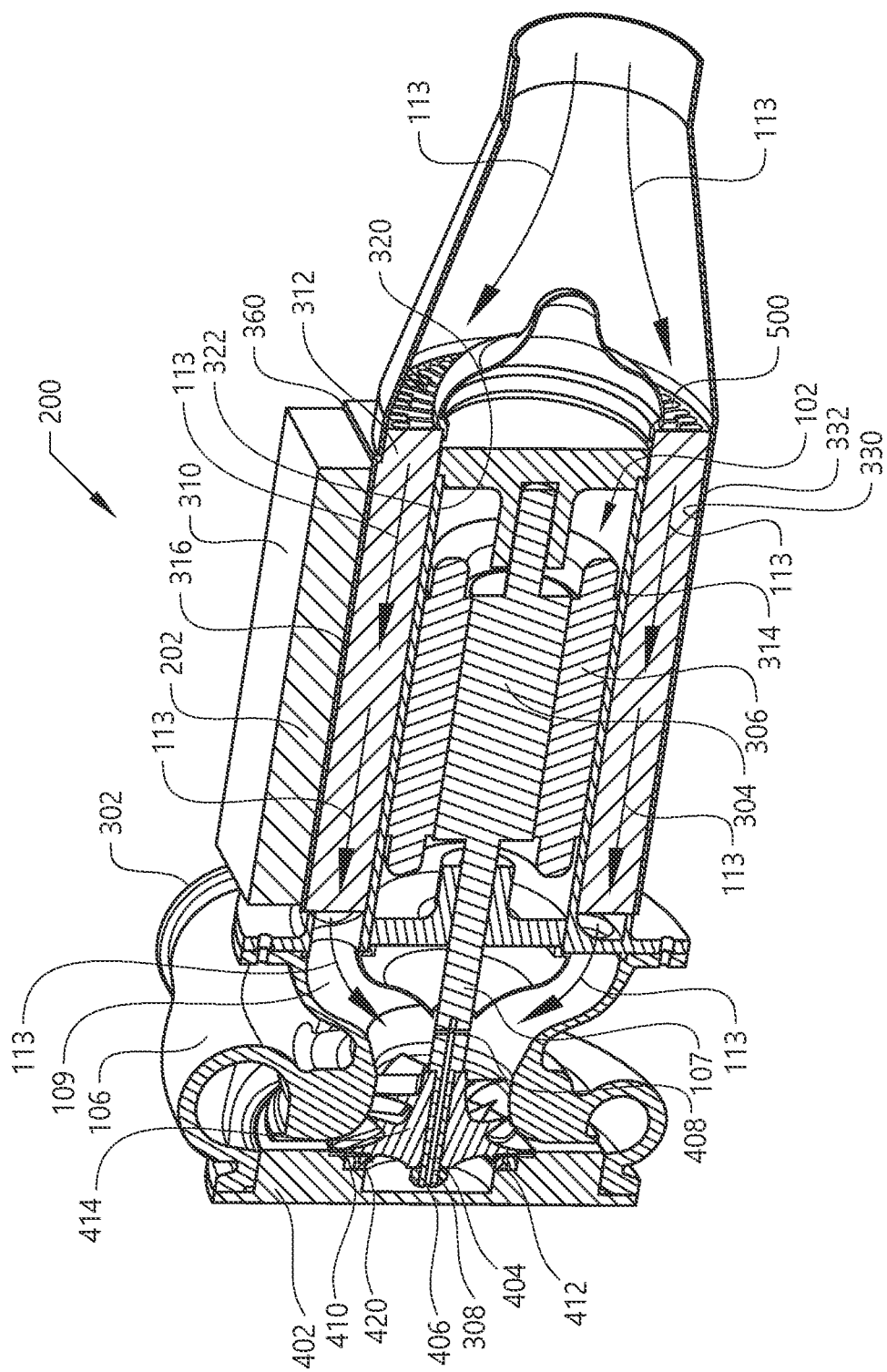
FIG. 4 is a cut-out view of the energy dissipation system in FIG. 3 according to an example embodiment.

In order to describe the energy dissipation system 200 in further detail, reference is now made to FIGS. 3 and 4. As described above, the energy dissipation system 200 comprises the electric motor 102 and the air compressor 106 (and optionally the air cooled resistor which is not described in relation to the description of FIGS. 3 and 4). The air compressor 106 comprises the compressor inlet 109 at which ambient air is fed to the air compressor, and an outlet 302 at which pressurized air is fed to the air conduit 111 depicted in FIG. 2.

The electric motor 102 comprises a rotor 304 having the above mentioned rotor shaft 107. The rotor shaft 107 is operatively connected to a compressor shaft 308 of the compressor 106. Although not depicted in the figures, a gearbox or transmission arrangement may be arranged between the rotor shaft 107 and compressor shaft 308 for increasing/decreasing the rotational ratio between these shafts. The electric motor 102 also comprises a stator 306 housing the rotor 304, i.e., rotor 304 is arranged radially inside the stator 306. As also indicated above, the energy dissipation system 200 comprises power electronics 202 configured to receive electric power from the electric power system 104, whereby the power electronics 202 is electrically connected to the electric motor 102 and configured to feed electric power to the electric motor 102 during operation thereof. The power electronics 202 is arranged in a power electronics housing 310.

As can be seen in FIG. 4, the energy dissipation system 200 comprises an air flow channel 312 through which ambient air 113 is flowing towards the compressor inlet 109. The air flow channel 312 is formed by an inner elongated tube member 314 and an outer elongated tube member 316, i.e., the air flow channel 312 corresponds to the radial space formed between the inner 314 and outer 316 elongated tube members. Although the inner 314 and outer 316 elongated tube members are illustrated as circular in cross section, other geometric shapes are also conceivable, such as quadratic, rectangular, etc. The air flow channel 312 is thus forming a housing 350 of the electric motor 102, which housing 350 is fixated to the air compressor 106 by suitable attachment elements 340, such as bolts, screws, rivets, etc.

The inner elongated tube member 314 comprises a first inner surface 320 and a first outer surface 322. The first inner surface 320 is facing the electric motor 102, while the first outer surface 322 faces the air flow channel 312, i.e., forms part of the air flow channel 312. The outer elongated tube member 316 comprises second inner surface 330 and a second outer surface 332. The second inner surface 330 is facing the air flow channel 312, i.e., forms part of the air flow channel 312, while the second outer surface 332 is facing the environment of the energy dissipation system 200. Accordingly, the first outer surface 322 and the second inner surface 330 faces each other.

As is further evident from FIG. 4, the electric motor 102 is housed within the inner elongated tube member 314. In yet further detail, the electric motor 102, and the stator 306 in particular, is attached to the first inner surface 320 of the inner elongated tube member 314. Furthermore, the power electronics housing 310 is on the other hand attached to the second outer surface 332 of the outer elongated tube member 316. The ambient air 113 flowing in the air flow channel 312 will thus conductively cool the electric motor 102 via the inner elongated tube member 314, as well as conductively cool the power electronics housing 310 and in turn the power electronics 202 via the outer elongated tube member 316.

The power electronics housing 310 is preferably attached to the attached to the second outer surface 332 at a position radially outside the electric motor 102. Thus, the electric motor 102 and the power electronics 202 will be cooled off at the same time. As can also be seen in FIGS. 3 and 4, the second outer surface 332 comprises a flat surface portion 360 onto which the power electronics housing 310 attached.

Furthermore, the air compressor 106 comprises a lid 402 at a rear end of the air compressor 106, i.e., at an opposite axial end of the air compressor compared to the axial end facing the electric motor 102. Also, the compressor shaft 308 comprises a recirculation channel 404 extending from an axial end position 406 of the compressor shaft 308 and into compressor inlet 109 via an opening 408. Further, a labyrinth seal 410 is formed in a back plate 412 of the compressor wheel 414, i.e., the labyrinth seal 410 is integrated with the back plate 412. A labyrinth seal member 420 of the labyrinth seal 410 is attached to the lid 402. By means of the labyrinth seal 410, in combination with the recirculation channel 404, the axial pressure exposed to the rotor shaft 107 can be balanced.

Furthermore, in order to increase the cooling capacity of the electric motor 102 and the power electronics 202, the energy dissipation system 200 further comprises a cooling structure 500 arranged in the air flow channel 312. As can be seen in FIG. 4, the cooling structure 500 extends along the air flow channel 312, preferably along the entire length of the air flow channel 312. In order to describe this cooling structure in further detail, reference is now made to FIG. 5, which is radial cross-section of the energy dissipation system 200.

Figure 5:
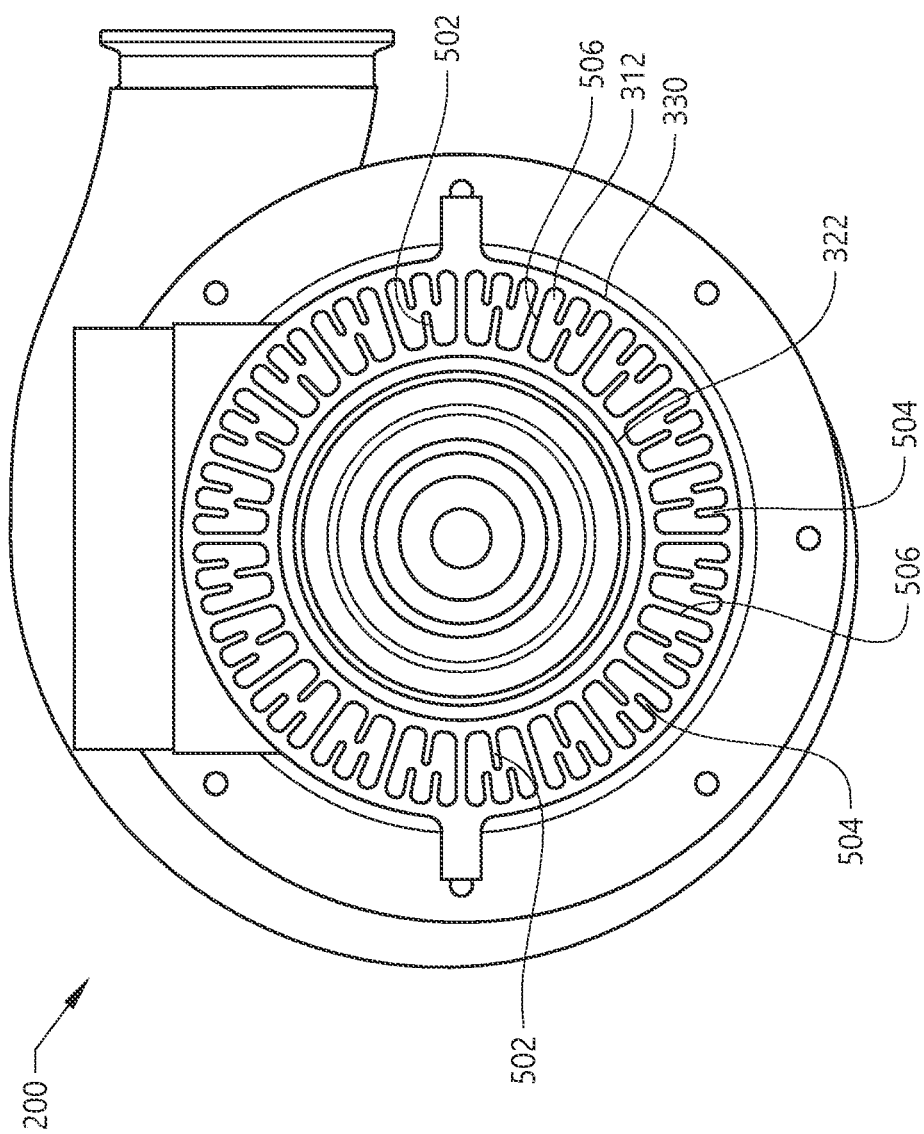
FIG. 5 is a side view in cross-section illustrating the air flow channel of the energy dissipation system according to an example embodiment.

As can be seen in FIG. 5, the cooling structure 500 comprises a first plurality of cooling protrusions 502. The first plurality of cooling protrusions 502 is arranged at the first outer surface 322. and extends towards the second inner surface 330. Further, the cooling structure 500 also comprises a second plurality of cooling protrusions 504. The second plurality of cooling protrusions 504 is arranged at the second inner surface 330 and extends towards the first outer surface 322. Hence the first 502 and second 504 plurality of cooling protrusions are hence arranged on opposite sides of the air flow channel as seen in the radial direction.

Moreover, and as exemplified in FIG. 5, a number of cooling protrusions of the first plurality of cooling protrusions 502 and a number of cooling protrusions of the second plurality of cooling protrusions 504 are different. According to the non-limiting example in FIG. 5, the number of cooling protrusions of the second plurality of cooling protrusions 504 is higher than the number of cooling protrusions of the first plurality of cooling protrusions 504.

Furthermore, the cooling structure 500 also comprises a third plurality of cooling protrusions 506. Each cooling protrusion of the third plurality of cooling protrusions 506 extends between the first outer surface 322 and the second inner surface 330.

It is to be understood that the present disclosure is not limited to the embodiments described above and illustrated in the drawings; rather, the skilled person will recognize that many changes and modifications may be made within the scope of the appended claims.

The invention claimed is:

1. An energy dissipation system for a vehicle, the energy dissipation system comprising:
   an air compressor comprising a compressor inlet configured to receive ambient air, and a compressor outlet configured to exhaust pressurized air into an air conduit;
   an electric motor comprising a rotor having a rotor shaft operatively connected to a compressor shaft of the air compressor, wherein the rotor shaft is suspended to a stationary motor housing by a pair of air bearings;
   power electronics arranged in a power electronics housing, the power electronics being electrically connected to the electric motor and configured to feed electric power to the electric motor; and
   an air flow channel through which the ambient air is configured to be fed to the compressor inlet, the air flow channel being formed by an inner elongated tube member and an outer elongated tube member;
   wherein the outer elongated tube member is radially spaced apart from the inner elongated tube member, the inner elongated tube member comprising a first inner surface and a first outer surface, and the outer elongated tube member comprising a second inner surface and a second outer surface, the first outer surface and the second inner surface facing each other;
   wherein the electric motor is housed within the inner elongated tube member and attached to the first inner surface;
   wherein the power electronics housing is attached to the second outer surface;
   wherein the energy dissipation system further comprises an air cooled resistor arranged in the air conduit in downstream fluid communication with the air compressor for receiving a flow of pressurized air exhausted by the air compressor into the air conduit.

2. The energy dissipation system of claim 1, wherein the power electronics housing is attached to the second outer surface at a position radially outside the electric motor.

3. The energy dissipation system of claim 1, wherein the electric motor comprising a stator housing the rotor, the stator being attached to the first inner surface.

4. The energy dissipation system of claim 1, further comprising a cooling structure arranged in the air flow channel.

5. The energy dissipation system of claim 4, wherein the cooling structure extends along the air flow channel and is attached to at least one of the first outer surface and the second inner surface.

6. The energy dissipation system of claim 4, wherein the cooling structure comprises a first plurality of cooling protrusions, the first plurality of cooling protrusions arranged at the first outer surface and extending towards the second inner surface.

7. The energy dissipation system of claim 6, wherein the cooling structure comprises a second plurality of cooling protrusions, the second plurality of cooling protrusions arranged at the second inner surface and extending towards the first outer surface.

8. The energy dissipation system of claim 7, wherein a number of cooling protrusions of the first plurality of cooling protrusions and a number of cooling protrusions of the second plurality of cooling protrusions are different.

9. The energy dissipation system of claim 4, wherein the cooling structure comprises a third plurality of cooling protrusions, each cooling protrusion of the third plurality of cooling protrusions extending between the first outer surface and the second inner surface.

10. A braking system for a vehicle, the braking system comprising:
- an electric traction motor configured to generate electric power during braking;
- an electric power system comprising an energy storage system configured to receive electric power from the electric traction motor during braking; and
- the energy dissipation system of claim 1, wherein the power electronics are electrically connected to the electric power system and configured to receive electric power generated during braking when an energy absorption capability of the energy storage system is below a predetermined threshold limit.

11. The braking system of claim 10:
wherein the air cooled resistor comprises an electrically conductive resistor element electrically connected to the electric power system.

12. A vehicle, comprising:
an electric traction motor configured to propel the vehicle;
an electric power system comprising an energy storage system, wherein the electric power system is electrically connected to the electric traction motor; and
the energy dissipation system of claim 1, wherein the power electronics are electrically connected to the electric power system for dissipating electric power generated by the electric traction motor during braking.

* * * * *